United States Patent
Mawatari (10) Patent No.: US 6,890,430 B2
(45) Date of Patent: May 10, 2005

(54) SOLDER DROSS REMOVAL APPARATUS AND METHOD

(75) Inventor: Shohei Mawatari, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 135 days.

(21) Appl. No.: 10/211,552

(22) Filed: Aug. 5, 2002

(65) Prior Publication Data

US 2003/0029782 A1 Feb. 13, 2003

(30) Foreign Application Priority Data

Aug. 7, 2001 (JP) ........................................ 2001-239659

(51) Int. Cl.[7] .............................. B23K 3/00; B26D 1/40
(52) U.S. Cl. .................... 210/173; 210/523; 228/34; 228/562; 241/46.06; 241/236; 241/243; 83/492
(58) Field of Search ................................ 210/173, 174, 210/523; 228/34, 56.1, 56.2; 241/46.01, 46.06, 227, 229, 236, 243; 83/492, 678

(56) References Cited

U.S. PATENT DOCUMENTS

| | | | | |
|---|---|---|---|---|
| 2,317,416 A | * | 4/1943 | Stanley | 241/46.01 |
| 3,002,625 A | * | 10/1961 | Lannert | 210/173 |
| 4,032,449 A | * | 6/1977 | De Visser et al. | 210/173 |
| 4,872,977 A | * | 10/1989 | Jackson | 210/173 |
| 5,061,380 A | * | 10/1991 | Stevenson | 241/46.06 |
| 6,214,218 B1 | | 4/2001 | Kawashima et al. | |
| 6,235,208 B1 | | 5/2001 | Kawashima et al. | |
| 6,578,752 B1 | * | 6/2003 | Willemen | 228/56.1 |
| 6,666,370 B2 | * | 12/2003 | McDonald | 228/34 |
| 6,719,144 B2 | * | 4/2004 | Tooyama et al. | 209/172.5 |
| 2002/0005376 A1 | | 1/2002 | Tooyama et al. | |
| 2002/0027157 A1 | | 3/2002 | Takano et al. | |

FOREIGN PATENT DOCUMENTS

| | | |
|---|---|---|
| JP | 64-71572 | 3/1989 |
| JP | 2001-234258 | 8/2001 |
| JP | 2002-80950 | 3/2002 |
| WO | 00 02695 | 1/2000 |

OTHER PUBLICATIONS

Patent Abstracts of Japan, entitled "*Method and Device for Reducing Solder Dross*", vol. 1998, No. 11, Sep. 30, 1998 & JP 10–163617 A (Sony Corp.), Jun. 19, 1998.

* cited by examiner

*Primary Examiner*—Christopher Upton
(74) *Attorney, Agent, or Firm*—Wenderoth, Lind & Ponack, L.L.P.

(57) ABSTRACT

A solder dross removal apparatus includes a holder adapted to be pivotably mounted to a container within which a pool of molten solder is kept at preset temperature. Dross is introduced into the container. A dross cutter assembly includes shafts rotatably supported by the holder and flat elongated cutter elements mounted on the shafts. The cutter elements are disposed perpendicular to the surface of the molten solder and partly submerged in the molten solder when the container is closed by the holder. The cutter elements are angularly offset from each other so that each end of the cutter elements lies on a spiral path. The cutter elements are rotated to repeatedly cut the dross into smaller pieces and force the dross as cut into the molten solder. This process removes oxides from the dross, and any free, reclaimed solder is returned to the molten solder.

8 Claims, 6 Drawing Sheets

SOLDER DROSS REMOVAL APPARATUS AND METHOD

BACKGROUND OF THE INVENTION

The present invention relates to an apparatus and method for removing oxides from dross and reclaiming solder from the dross.

A wave soldering machine is designed to automatically solder electronic components to a printed circuit board. Typically, a conventional wave soldering machine includes a solder reservoir within which a supply of molten solder is kept at a preset temperature. At least one solder wave nozzle is arranged in the solder reservoir, and a pump is associated with the solder wave nozzle to pump the molten solder upwardly through the solder wave nozzle to produce a solder wave. The printed circuit board is passed over the top of the solder wave to skim its surface. During this passage, conductive solder joints are formed between electronic components and the printed circuit board.

A problem associated with such a wave soldering machine is that dross, typically oxides of tin and lead, is generated wherever molten solder is exposed to atmospheric air. Dross generation not only adds considerably to the cost of the wave soldering process due to the value of lost solder, but also is detrimental to the quality of the resulting solder joint.

Various attempts have been made to remove dross and reclaim solder from the dross. For example, U.S. Pat. No. 6,235,208 teaches the use of an oxides separating agent such as rice bran adapted to facilitate removal of dross or tin and lead oxides. A netted container is partly dipped into a pool of molten solder which is, in turn, held in a solder reservoir. Dross present on the surface of the molten solder is transported from the solder reservoir to the netted container. A spoon is employed to spread a suitable oxide separating agent over the dross. The netted container is repeatedly dipped into and lifted up from the pool of molten solder. As a result of this procedure, tin and lead oxides are left in the container while reclaimed solder is returned to the solder reservoir. It is to be understood that dross consists of pockets of good solder which are surrounded by a crust-like envelope of tin and lead oxides. Liquid solder can escape from the oxide crust when the dross is continuously heated to a sufficient temperature. In this procedure, however, dross is cooled when the netted container is lifted up from the pool of molten solder. Thus, this procedure is not satisfactory.

Accordingly, it is an object of the present invention to provide a solder dross removal apparatus and method which can efficiently and effectively remove oxides from dross and reclaim solder from the dross.

SUMMARY OF THE INVENTION

According to one aspect of the present invention, there is provided a solder dross removal apparatus which comprises a holder or cover assembly adapted to be mounted to a container within which a pool of molten solder is kept at preset temperature. The container is adapted to receive dross from an external soldering machine. As a feature, a dross cutter assembly includes at least one shaft rotatably supported by the holder, and a plurality of substantially flat, elongated cutter elements mounted on the shaft. The cutter elements are disposed substantially perpendicular to the surface of the molten solder and partly submerged in the molten solder when the container is closed by the holder. The cutter elements are operable to cut the dross into small pieces and cause the dross as cut to be submerged in the molten solder. This process keeps the dross at a sufficiently high temperature and thus, effectively removes oxides from the dross. Any free, reclaimed solder is returned to the molten solder.

In a preferred embodiment, a plurality of shafts are rotatably supported by the holder. The cutter elements are arranged on each of the shafts so that each of the cutter elements on one of the shafts is located between the corresponding cutter elements on adjacent shafts. The cutter elements on each of the shafts are angularly offset from each other so that each end of the cutter elements lies on a spiral path. This arrangement promote movement of the dross from one side to the other side of the container. Preferably, the motor is of a reversible type. When the dross is moved from one side to the other side of the container, rotation of the motor is reversed to continuously remove oxides from the dross. Alternatively, rotation of the motor may be repeatedly reversed until the dross is moved from one side to the other side of the container. During rotation of the motor, the shafts are all rotated in the same direction.

In a preferred embodiment, a solder dross removal apparatus is assembled to an automated wave soldering machine. The wave soldering machine includes a solder reservoir within which a pool of molten solder is kept at a preset temperature, for example, approximately 50° C. above the melting point of solder used. The solder dross removal apparatus includes a hood adapted to be attached to one side of the solder reservoir, and a dross cutter assembly mounted within the hood. The dross cutter assembly includes a plurality of shafts rotatably carried by the hood, and a plurality of substantially flat, elongated cutter elements mounted on the shafts. The cutter elements are partly submerged in the molten solder. The cutter elements are rotated so as to slice the dross and force the dross as sliced into the molten solder.

According to another aspect of the present invention, there is provided a solder dross removal method which comprises introducing dross into a container within which a pool of molten solder is held at a preset temperature, cutting the dross present on the molten solder into smaller pieces, and forcing the dross as cut into the molten solder. Preferably, the dross is repeatedly cut and submerged in the solder reservoir. Preferably, an oxide separating agent is distributed over the dross to promote removal of oxides from the dross before the dross is cut.

The above and other objects, features and advantages of the present invention will be apparent from the following detailed description of the preferred embodiments of the invention, as illustrated in the accompanying drawings.

DESCRIPTION OF THE PREFERRED EMBODIMENTS

Figure 1:
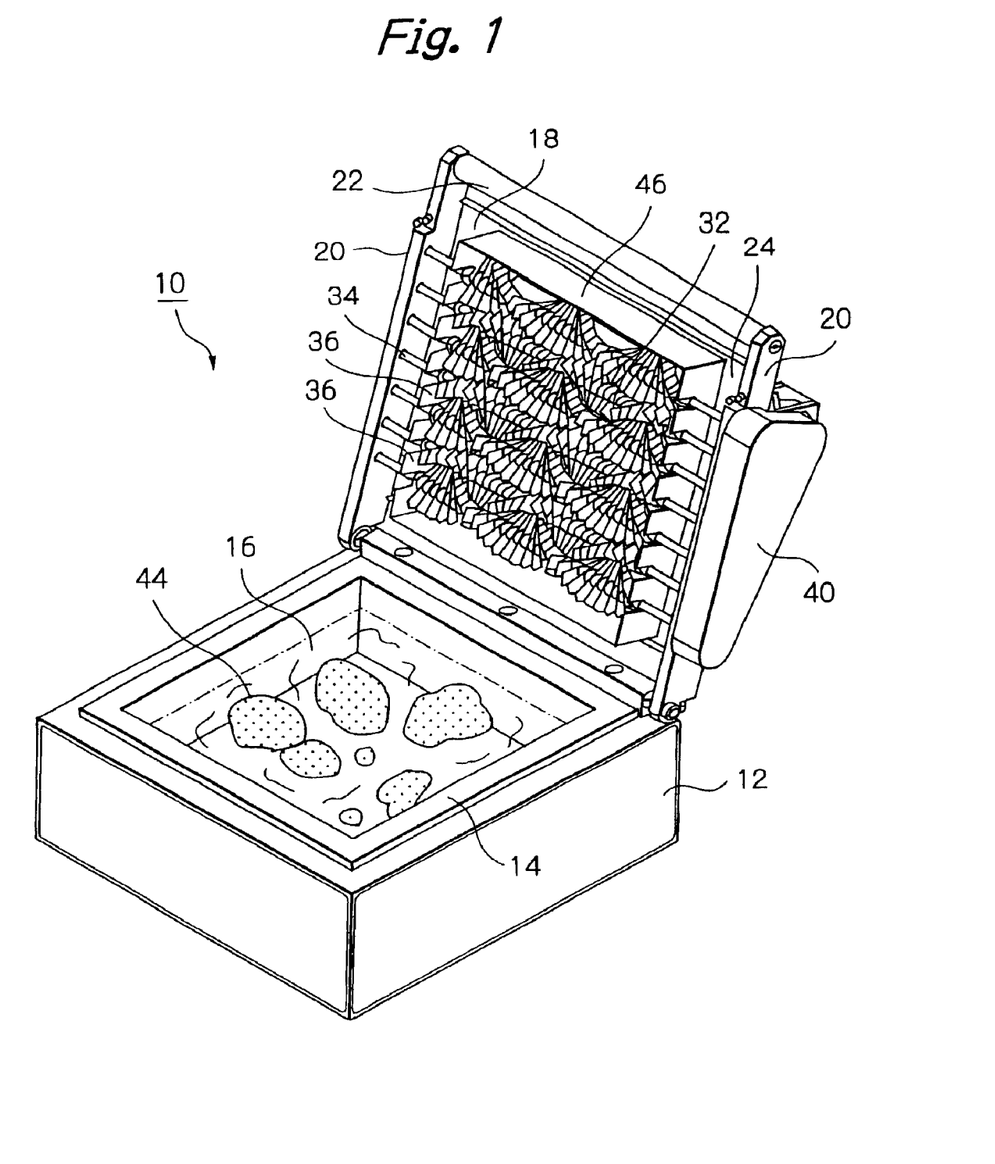
FIG. 1 is a perspective view of a solder dross removal apparatus according to one embodiment of the present invention, with a cover assembly placed in its open or inoperative position.
Figure 2:
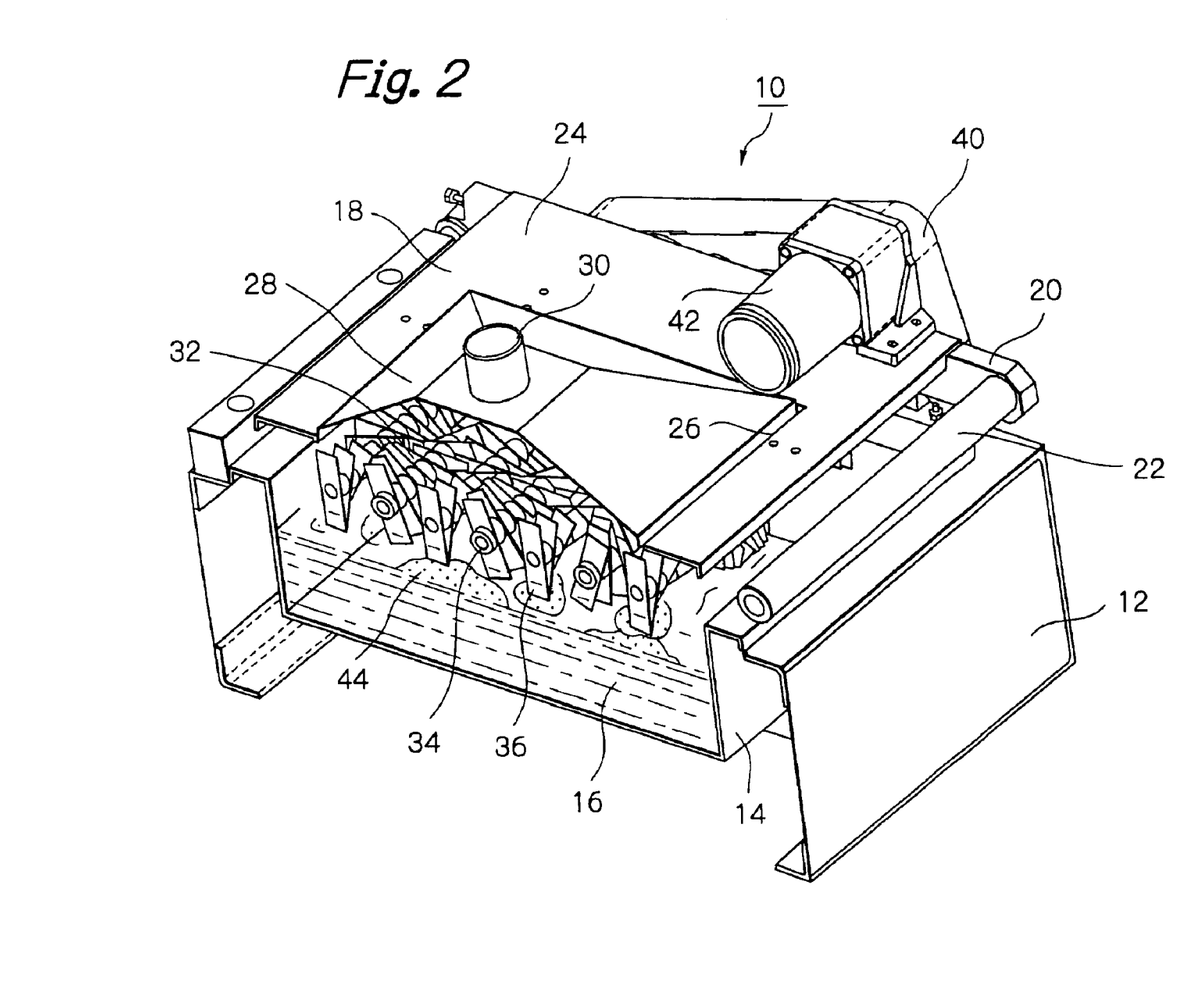
FIG. 2 is a perspective view, partly broken away, of the solder dross removal apparatus with the cover assembly placed in its closed or operative position.
Figure 3:
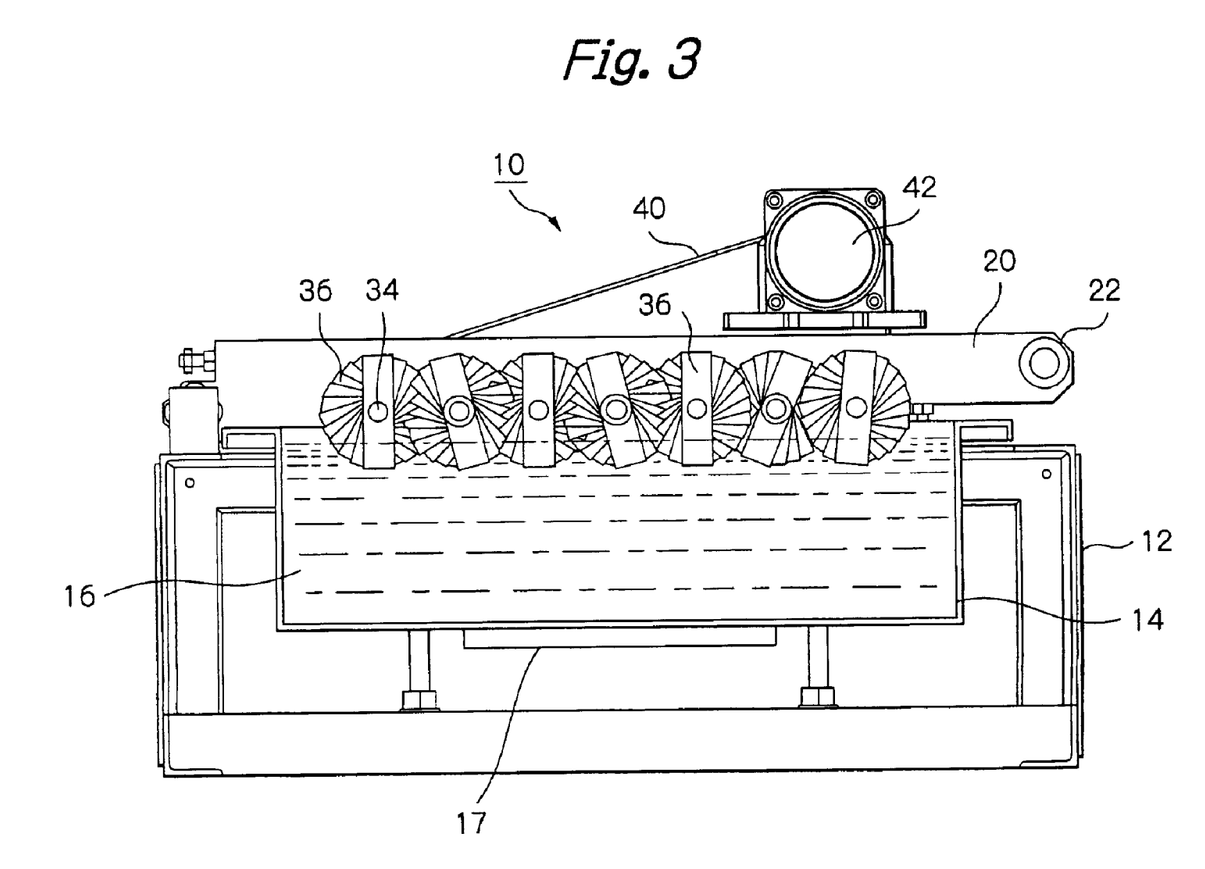
FIG. 3 is a sectional front view of the solder dross removal apparatus shown in FIG. 2.

Referring now to FIGS. 1 to 4, there is shown a solder dross removal apparatus according to one embodiment of the present invention and generally indicated by reference numeral 10. The solder dross removal apparatus 10 includes a rectangular base 12 in which a rectangular container 14 is mounted to receive molten solder 16. As schematically shown in FIG. 3, a heater 17 is mounted outside of the container 14 to keep the molten solder 16 at a preset temperature. Alternatively, the heater 17 may be mounted within the container 14.

A holder or cover assembly 18 is pivotably mounted to the base 12 to selectively open and close the open top of the container 14. More specifically, the cover assembly 18 includes a pair of elongated side plates 20 pivotably connected at their one end to one side of the container 14 and provided at their other end with an elongated grip 22. As better shown in FIG. 2, a flat cover plate 24 is seated on the top edge of the side plates 20. The cover plate 24 has a rectangular opening 26 to receive a raised roof assembly 28. An exhaust pipe 30 is connected to the roof assembly 28 to provide a communication between the interior and exterior of the container 14.

A dross cutter assembly 32 is rotatably mounted between the side plates 20. More specifically, the dross cutter assembly 32 includes a plurality of shafts 34 extending between the side plates 20 and arranged at equal intervals, and a plurality of substantially flat, elongated plates or cutter elements 36 secured onto each of the shafts 34 and arranged at equal intervals. As better shown in FIG. 1, the shafts 34 are rotatably supported at their one end by one of the side plates 20. As better shown in FIG. 4, the side plates 20 are provided at their other end with two sprockets 38. All of the sprockets 38 are encased by a sprocket casing 40 which is, in turn, secured to one of the side plates 20. Belts (not shown) extend around two adjacent sprockets 38 to thereby interlock all of the sprockets 38. A reversible motor 42 is mounted on the cover plate 24 and drivingly connected to one of the sprockets 38 located closest to the motor 42. The shafts 34 are rotated in the same direction when the motor 42 is activated.

Figure 4:
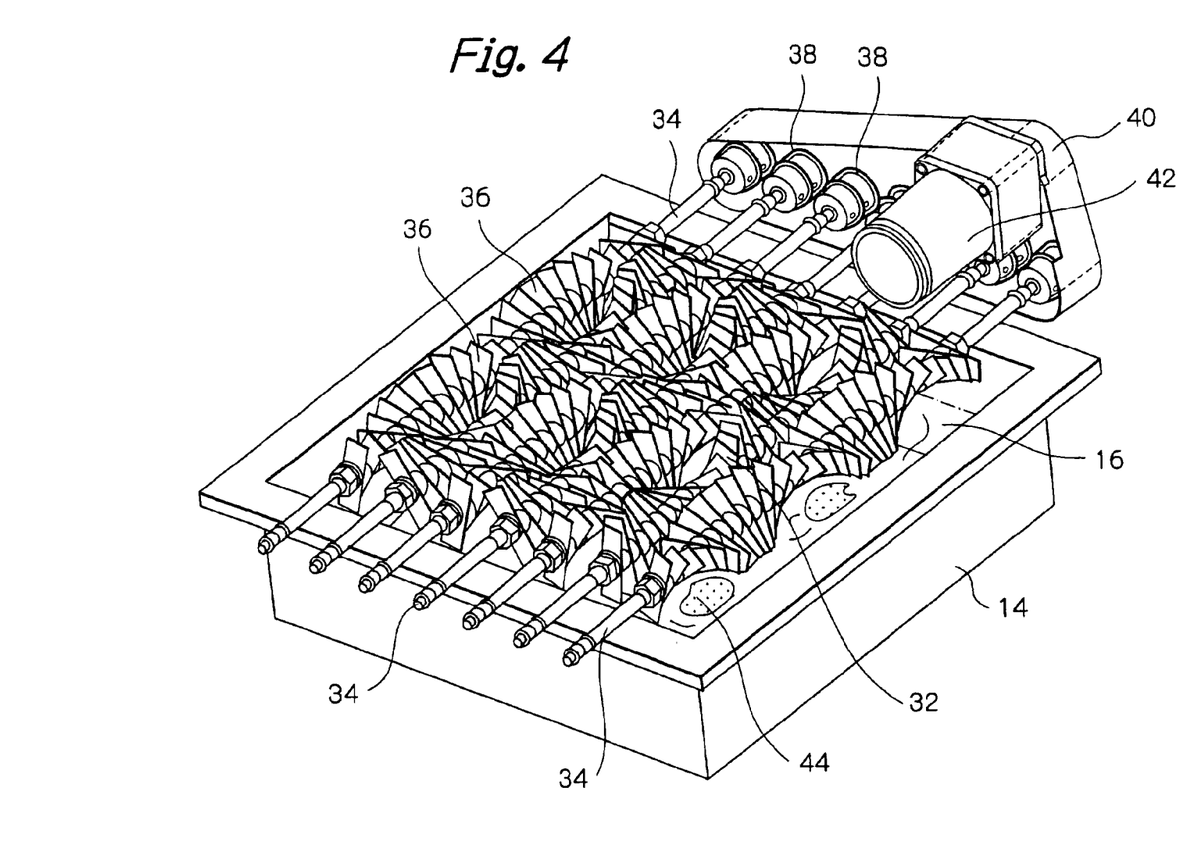
FIG. 4 is a perspective view of the solder dross removal apparatus with the cover assembly removed to show how cutter elements are arranged.

In the illustrated embodiment, each of the cutter elements 34 on one of the shafts 36 is located between the corresponding cutter elements 34 on its adjacent shafts 36 so that no interference occurs between the cutter elements 34 on adjacent shafts. The cuter elements 34 are disposed substantially perpendicular to the surface of the molten solder 16. Preferably, the level of the molten solder 16 in the container 14 is such that at least one fourth of each of the cutter elements 34 is submerged in the molten solder 16 when the container 14 is closed by the cover assembly 18. As best shown in FIG. 4, the cutter elements 34 on each of the shafts 36 are angularly offset from each other by, for example, 10° C. to 20° C. so that each end of the cutter elements 34 lie on a spiral path. This arrangement facilitates feeding of the dross 44 from the cutter elements 36 on one of the shafts 34 toward the cutter elements 36 on its subsequent shafts 34 when all of the shafts 34 are rotated in the same direction. In the illustrated embodiment, the cutter elements 36 have a rectangular shape. Alternatively, the cutter elements 36 may have a crisscross or other shapes. A cutter casing 46 is attached to the underside of the cover plate 24 and extends around the cutter elements 36.

In use, the molten solder 16 in the container 14 is heated to a temperature of, for example, approximately 50° C. above the melting point of the solder. With the cover assembly 18 placed in its open or inoperative position as shown in FIG. 1, large pieces of dross 44 are transported from an automated soldering apparatus (not shown) into the container 14 by the use of, for example, a ladle (not shown). After the container 14 is closed by the cover assembly 18 as shown in FIG. 2, the motor 42 is energized to rotate all of the shafts 34 and thus, the cutter elements 36 in the same direction. This rotation causes the dross 44 to be cut into smaller pieces. The size of the dross 44 is gradually decreased while the dross 44 is being transported from one side of the container 14 to the other side. It is to be understood that dross consists of pockets of good solder which are surrounded by a crust-like envelope of tin and lead oxides. As the dross becomes smaller, heat is more effectively transferred from the molten solder to the dross. This allows liquid solder to more readily escape from the oxide crust. Additionally, the dross is at least partly or completely submerged in the molten solder 16 while the cutter elements 36 are being rotated. This also promotes escapement of the liquid solder from the oxide crust. Any free, reclaimed solder is returned to the molten solder 16. Once all of the dross 44 has been moved from one side of the container 14 to the other side, rotation of the motor 42 may be reversed to continue the same process. Advantageously, rice bran and other oxide separating agents may be distributed or spread over the dross to promote recovery of good liquid solder from the dross before the cutter elements are rotated. Details of such oxide separating agents are disclosed in U.S. Pat. No. 6,235,208 issued to Kawashima et al., the content of which is incorporated herein by reference.

Figure 5:
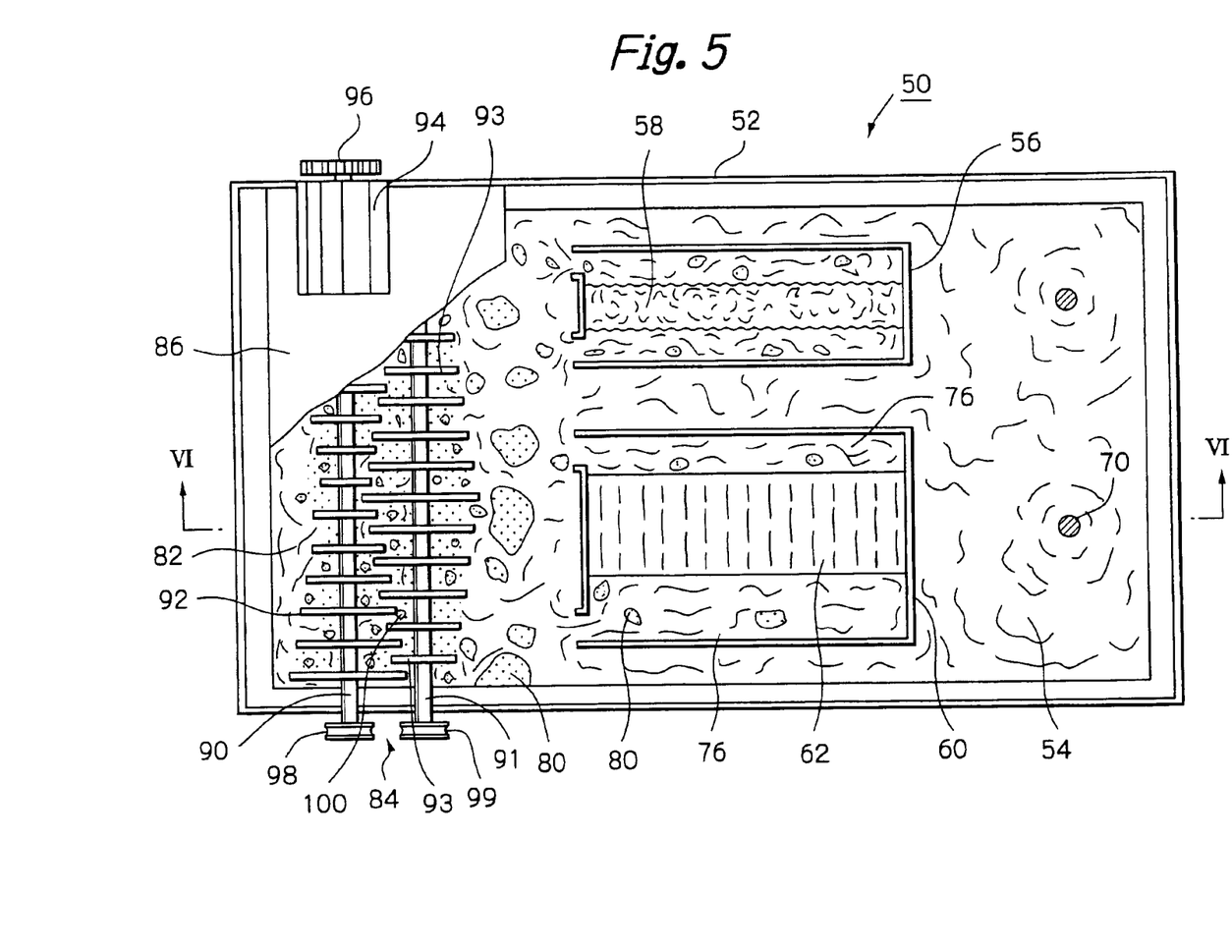
FIG. 5 is a plan view of a solder dross removal apparatus made according to another embodiment of the present invention, with part broken away to show how the solder dross removal apparatus is assembled to a wave soldering machine.
Figure 6:
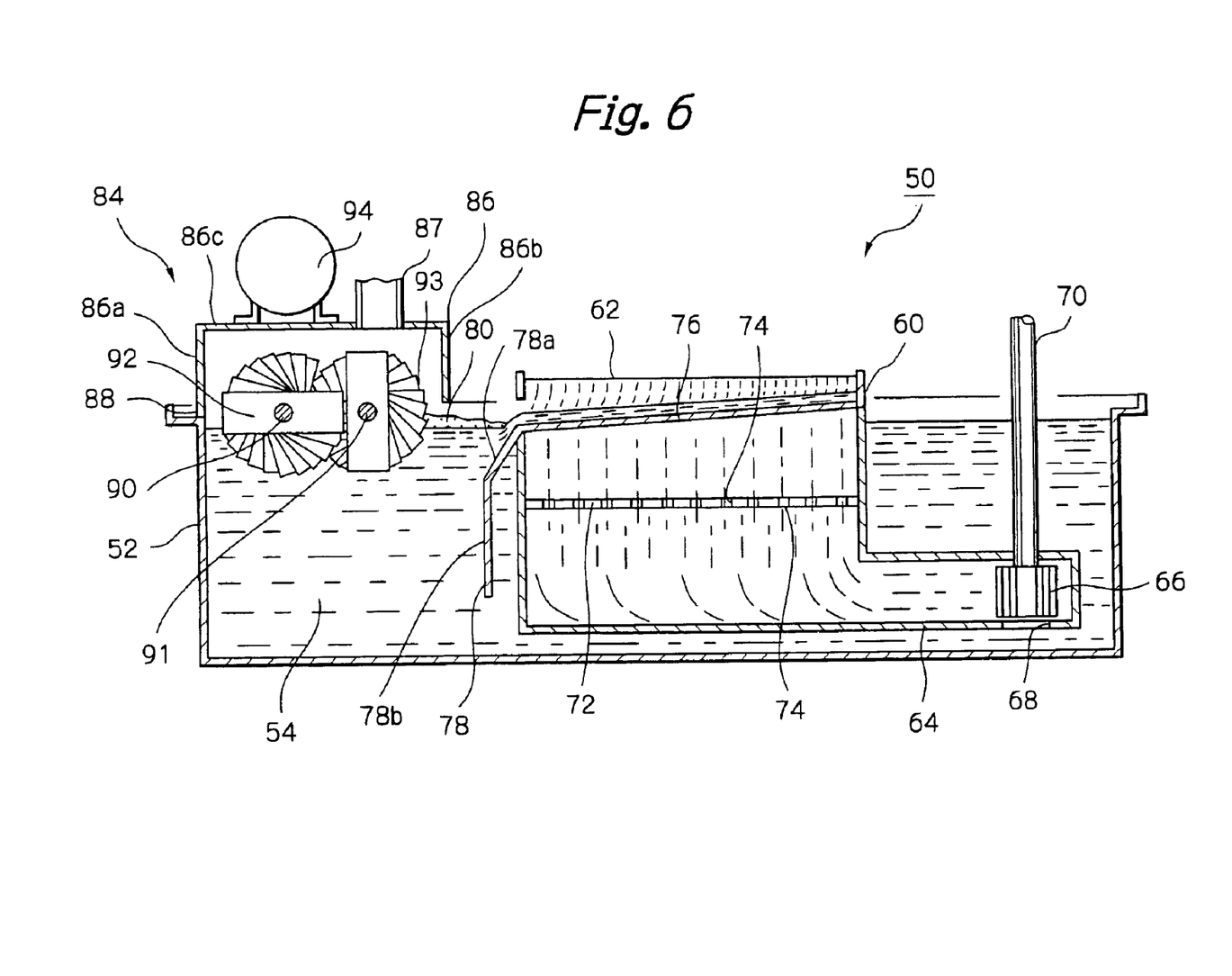
FIG. 6 is a sectional view taken along the line VI—VI in FIG. 5.

FIGS. 5 and 6 show a wave soldering machine with a solder dross removal apparatus assembled according to another embodiment of the present invention.

Specifically, a wave soldering machine 50 includes a rectangular solder reservoir 52 within which a pool of molten solder 54 is kept at a preset temperature by a suitable heater assembly (not shown). A relatively narrow solder wave nozzle 56 is vertically disposed in the solder reservoir 52 to produce a turbulent wave 58. The turbulent wave 58 enables the molten solder to fill the gap between leads of electronic components (not shown) and through holes (not shown) in a printed circuit board (not shown). A relatively wide solder wave nozzle 60 is vertically disposed downstream of the narrow solder nozzle 56 to produce a smooth laminar flow solder wave 62. The smooth solder wave 62 serves to remove bridges, icicles and other solder deposits which may be formed while the printed circuit board (not shown) passes through the turbulent wave 58. As better shown in FIG. 6, a horizontal duct 64 has one end connected to the lower end of the wide solder wave nozzle 60. A solder pump 66 is disposed within the other end of the duct 64. An inlet opening 68 is defined in a portion of the duct 64 below the pump 66. A vertical drive shaft 70 has one end connected to the pump 66. The other end of the shaft 70 extends up above the solder reservoir 52. A pulley (not shown) is secured to the other, free end of the shaft 70. A belt (not shown) extends between the pulley and the output shaft of a motor (not shown). The motor is energized to activate the pump 66 through the belt-and-pulley assembly. This activation allows the molten solder within the solder reservoir 52 to flow into the duct 64 through the inlet opening 68. The molten solder is caused to flow in a turbulent fashion as a result of the continued pumping action of the pump 66. To provide for uniform flow of the molten solder within the nozzle 60, a flow control plate 72 is mounted within the nozzle 60 adjacent to the juncture between the nozzle 60 and the duct 64. The flow control plate 72 is formed with a number of apertures 74. The apertures 74 are so arranged that the molten solder has a substantially straight vertical path above the flow control plate 72 to provide a substantially parallel solder wave. A pair of elongated side troughs 76 is formed in the longitudinal sides of the wide solder wave nozzle 60. As better shown in FIG. 6, the side troughs 76 are inclined at an acute angle to the horizontal. A guide plate 78 is attached to each of the downwardly sloping troughs 76. The guide plate 78 has a bent first section 78a extending forwardly and downwardly from the lower end of the sloping side trough 76, and a vertical second section 78b connected to the lower end of the first section 78a and terminating a short distance above the bottom of the solder reservoir 52. Dross 80 is generated when the liquid solder is pumped up through the solder wave nozzle 60 and contacted with atmospheric air. The guide plates 78 serve to direct the dross 80 toward a dross zone 82 which is located in one side of the solder reservoir 52 opposite the pumps 66. The guide plates 78 also act as barriers to prevent the dross 80 from flowing below or toward the duct 64.

It should be understood that the narrow solder wave nozzle 56 is substantially similar in structure to the wide solder wave nozzle 60, except that the nozzle opening of the narrow solder nozzle 56 is narrower than that of the wide solder wave nozzle 60. Thus, the structure of the narrow solder wave nozzle 56 will not be described herein.

A solder dross removal apparatus is assembled to one side of the wave soldering machine 50 and generally designated by reference numeral 84. The solder dross removal apparatus 84 is adapted to receive the dross 80 from the solder wave nozzles 56, 60. The solder dross removal apparatus 84 includes a hood 86 extending across one side of the solder reservoir 52 opposite the pump 66. As better shown in FIG. 6, the hood 86 has a substantially inverted U-shape and includes vertical side plates 86a, 86b and a flat top plate 86c extending between the side plates 86a, 86b. An exhaust pipe 87 is mounted to the top plate 86c and adapted to provide a communication between the interior and exterior of the hood 86. The side plate 86a is mounted as at 88 to the solder reservoir 52. The side plate 86b depends from the top plate 86c and terminates shortly above the level of the molten solder 54 so that the dross 80 can flow into the hood 86. Illustratively, a dross cutter assembly includes two shafts 90, 91 mounted within the hood 86 and arranged in a side-by-side relationship. As in the previous embodiment, a plurality of substantially flat, elongated plates or cutter elements 92, 93 are secured onto the shafts 90, 91, respectively and arranged at equal intervals. As better shown in FIG. 5, the cutter elements 92 on the shaft 90 are each interposed between adjacent cutter elements 93 on the shaft 91. Both of the cutter elements 92, 93 are angularly offset by, for example, 10° C. to 20° C. so that the ends of the cutter elements 92, 93 lie on a spiral path. Preferably, at least one fourth of the cutter elements 92, 93 is submerged in the molten solder 54 as better shown in FIG. 6.

A motor 94 is mounted on the top plate 86c of the hood 86. The shaft 90 is provided at its one end with a gear 96 which is connected to the motor 94. A pulley 98 is mounted onto the other side of the shaft 90. Also, a corresponding pulley 99 is mounted onto the shaft 91. A belt (not shown) extends around the two pulleys 98, 99. The two shafts 90, 91 and thus, the cutter elements 92, 93 are simultaneously rotated in the same direction as the motor 94 is energized.

In use, the pump 66 is activated to draw the molten solder 54 into the duct 64 through the inlet opening 68. The molten solder 54 then flows toward the solder wave nozzle 60. When the liquid solder passes through the apertures 74 in the flow control plate 72, the liquid solder has a substantially straight vertical path. A series of printed circuit boards (not shown) pass over the solder wave 62 established in the solder wave nozzle 60. At this time, the underside of the boards comes into contact with the solder wave whereby solder bumps and connections are formed on the printed circuit boards.

When the liquid solder is pumped up through the solder nozzle 60, the liquid solder falls into the sloping side troughs 76. At this time, the liquid solder is exposed to and contacted with atmospheric air. As a result, the dross 80 forms on the surface of the liquid solder. The sloping side troughs 76 cause the dross 80 to flow toward the hood 86 of the solder dross removal apparatus 84. When the dross 80 reaches the cutter elements 93, the dross 80 is sliced as at 100. The dross 100 as sliced is forced into the molten solder 54 during subsequent rotation of the cutter elements 93. This promotes removal of oxides and other contaminants from the dross 80. Any free or reclaimed solder is returned to the molten solder 54 in the solder reservoir 52. When the remaining dross 80 reaches the cutter elements 92, the dross 80 is further cut into smaller pieces. The dross 80 is then again submerged in the molten solder 54 during subsequent rotation of the motor. This process further causes oxides and other contaminants to be removed from the remaining dross. As in the previous embodiment, a suitable oxide separating agent may be employed.

Although the present invention has been described with respect to its preferred embodiments, it is to be understood that various modifications and changes may be made without departing from the scope of the invention as defined by the appended claims.

What is claimed is:

1. A solder dross removal apparatus comprising:
   a holder adapted to selectively open and close a container within which a pool of molten solder is kept at a preset temperature, said container being adapted to receive dross from an external soldering machine;
   drive means mounted to said holder; and
   a dross cutter assembly including at least one substantially horizontal shaft carried by said holder and rotated by said drive means, and a plurality of substantially flat cutter elements mounted on said at least one shaft, said plurality of cutter elements being disposed substantially perpendicular to a surface of the molten solder and partly submerged in the molten solder when the container is closed by said holder, said plurality of cutter elements being operable to cut the dross into smaller pieces and cause the dross as cut to be submerged in the molten solder, whereby oxides are removed from the dross, and reclaimed solder is returned to the molten solder.

2. A solder dross removal apparatus according to claim 1, wherein said plurality of cutter elements have a rectangular shape, said plurality of cutter elements being angularly offset from each other so that each end of said plurality of cutter elements lies on a spiral path.

3. A solder dross removal apparatus according to claim 1, wherein said plurality of cutter elements are mounted so that at least one fourth of said plurality of cutter elements is submerged in the molten solder when the container is covered by said holder.

4. A solder dross removal apparatus according to claim 1, further comprising a plurality of shafts rotatably supported by said holder and arranged at equal intervals, said plurality of cutter elements being mounted on each of said plurality of shafts so that each of said cutter elements on one of said plurality of shafts is located between the corresponding cutter elements on adjacent shafts.

5. A solder dross removal apparatus according to claim 1, wherein said at least one shaft has opposite ends supported by opposite sides of said holder, respectively.

6. A solder dross removal apparatus comprising:
   a holder adapted to selectively open and close a container within which a pool of molten solder is kept at a preset temperature, said container being adapted to receive dross from an external soldering machine;
   a reversible motor mounted to said holder; and
   a dross cutter assembly including a plurality of shafts carried by said holder and rotated by said reversible motor, and a plurality of substantially flat cutter elements mounted on each of said plurality of shafts, said plurality of cutter elements being disposed substantially perpendicular to a surface of the molten solder and partly submerged in the molten solder when the container is closed by said holder, said plurality of cutter elements being operable to cut the dross into smaller pieces and cause the dross as cut to be submerged in the molten solder, whereby oxides are removed from the dross and reclaimed solder is returned to the molten solder,
   wherein said plurality of shafts are all rotated in the same direction.

7. A solder dross removal apparatus comprising:
   a container adapted to hold a pool of molten solder at a preset temperature and receive dross from an external soldering machine;
   a cover assembly pivotably mounted to said container so as to selectively open and close said container;
   a motor mounted to said cover assembly; and
   a dross cutter assembly including a plurality of substantially horizontal shafts mounted to said cover assembly and rotated by said motor, and a plurality of elongated cutter elements mounted on said plurality of shafts,
   said plurality of cutter elements being disposed substantially perpendicular to a surface of the molten solder and partly submerged in the molten solder when the container is closed by said cover assembly, said plurality of cutter elements being rotated to thereby cut the dross into smaller pieces and cause the dross as cut to be submerged in the molten solder, whereby oxides are removed from the dross, and reclaimed solder is returned to the molten solder.

8. A solder dross removal apparatus according to claim 7, wherein said plurality of cutter elements are angularly offset from each other so that each end of said plurality of cutter elements lies on a spiral path.

* * * * *